United States Patent
Narita

(10) Patent No.: US 9,774,685 B2
(45) Date of Patent: Sep. 26, 2017

(54) ELECTRONIC DEVICE, MOBILE TERMINAL CONNECTION CONTROL METHOD, AND POWER CONTROL PROGRAM

(71) Applicant: Alpine Electronics, Inc., Tokyo (JP)

(72) Inventor: Koichi Narita, Fukushima (JP)

(73) Assignee: ALPINE ELECTRONIC, INC., Tokyo (JP)

( * ) Notice: Subject to any disclaimer, the term of this patent is extended or adjusted under 35 U.S.C. 154(b) by 443 days.

(21) Appl. No.: 14/559,644

(22) Filed: Dec. 3, 2014

(65) Prior Publication Data
US 2015/0203059 A1   Jul. 23, 2015

(30) Foreign Application Priority Data
Jan. 20, 2014   (JP) .................. 2014-007558

(51) Int. Cl.
| | |
|---|---|
| B60L 1/00 | (2006.01) |
| B60L 11/18 | (2006.01) |
| B60R 16/033 | (2006.01) |
| B60W 10/26 | (2006.01) |
| H04W 52/02 | (2009.01) |
| H04L 29/08 | (2006.01) |

(52) U.S. Cl.
CPC .............. *H04L 67/12* (2013.01); *B60L 1/006* (2013.01); *B60L 11/1861* (2013.01); *B60R 16/033* (2013.01); *B60W 10/26* (2013.01); *H04W 52/0261* (2013.01); *H04W 52/0296* (2013.01); *Y02B 60/50* (2013.01)

(58) Field of Classification Search
CPC .. B60L 1/006; B60L 11/1851; B60L 11/1861; B60R 16/03; B60R 16/033; B60W 10/24; B60W 10/26; H04L 67/12; H04W 52/0261; H04W 52/0296
USPC .................................................. 307/9.1, 10.1
See application file for complete search history.

(56) References Cited

U.S. PATENT DOCUMENTS

| | | | |
|---|---|---|---|
| 6,528,899 B1 * | 3/2003 | Saito | H02J 1/14 307/10.1 |
| 7,869,911 B2 | 1/2011 | Yamaguchi | |
| 2010/0244560 A1 * | 9/2010 | Sato | B60R 16/03 307/10.1 |

FOREIGN PATENT DOCUMENTS

| | | |
|---|---|---|
| JP | 2004/106621 | 4/2004 |
| JP | 2007/191097 | 8/2007 |

* cited by examiner

*Primary Examiner* — Levi Gannon
(74) *Attorney, Agent, or Firm* — Brinks Gilson & Lione

(57) ABSTRACT

A power control program (mobile terminal connection program) 300 is configured to include a mobile terminal connection unit 302 which connects a plurality of mobile terminals 20 and enables charging of power supplied from a battery, a usage state monitoring unit 304 which monitors usage states of the connected mobile terminals 20, a cranking detection unit 306 which detects cranking based on the voltage supplied from the battery, and a control unit 308 which controls power supply of the mobile terminal connection unit 302 based on monitoring information of the usage state monitoring unit 304 when the cranking is detected.

18 Claims, 8 Drawing Sheets

10 MOBILE TERMINAL CONNECTION SYSTEM

20 MOBILE TERMINAL

FIG. 3
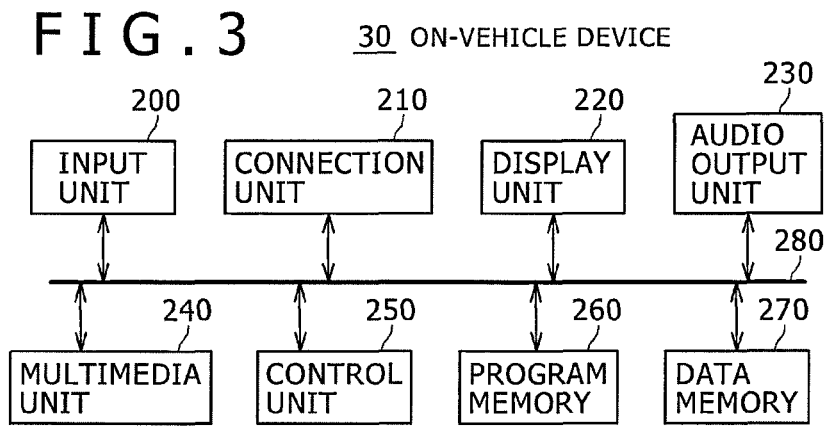
FIG. 4
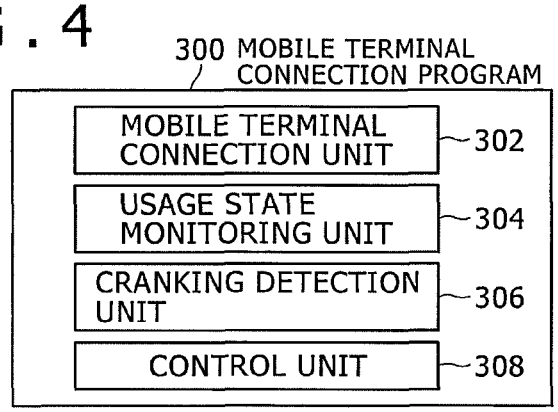
FIG. 5
MONITORING INFORMATION
| CONNECTION PORT | PORT TYPE | USAGE STATE |
|---|---|---|
| PORT1 | BC1.2 | HANDS-FREE CONVERSATION |
| PORT2 | SDP | MUSIC REPRODUCTION |
| PORT3 | CDP | UNUSED STATE (IN CHARGING) |
| PORT4 | SDP | UNUSED STATE (IN CHARGING) |

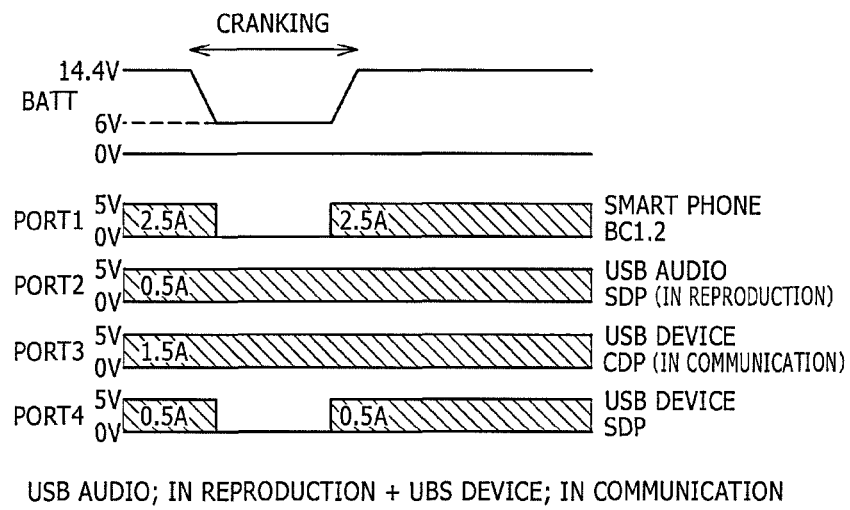
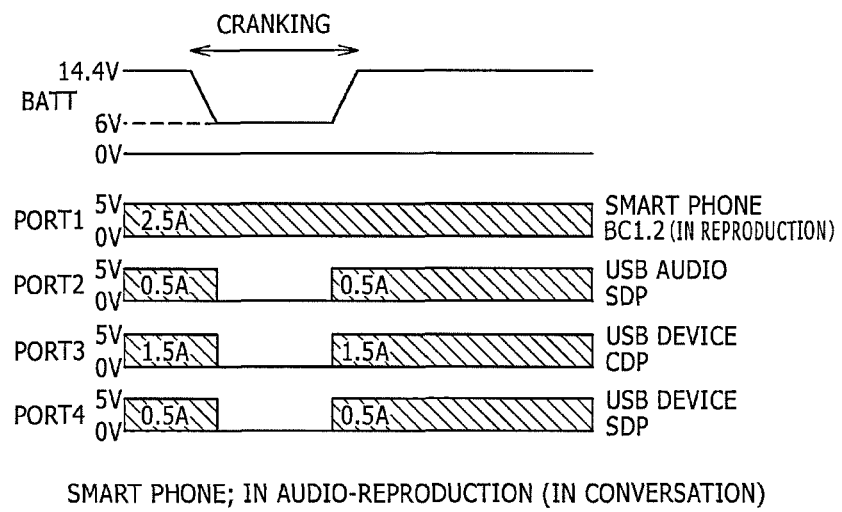

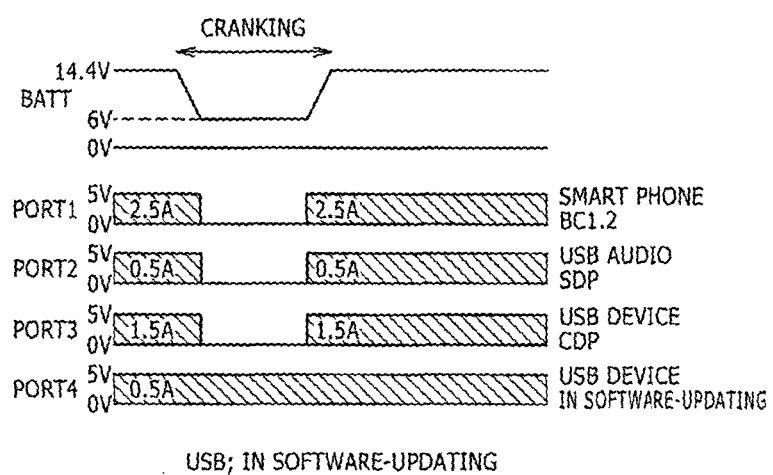

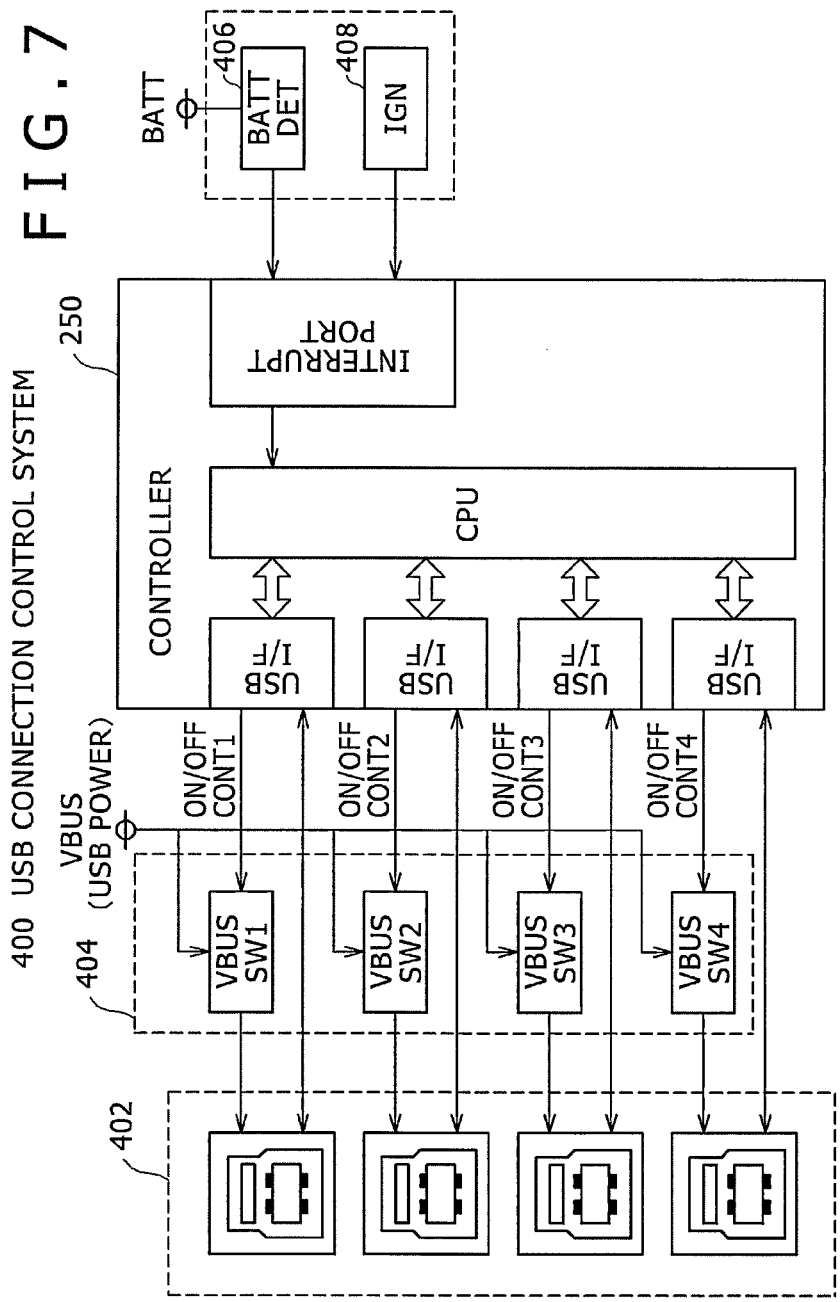

PRIOR ART

<POWER SUPPLY CONTROL IN RELATED ART>

ELECTRONIC DEVICE, MOBILE TERMINAL CONNECTION CONTROL METHOD, AND POWER CONTROL PROGRAM

RELATED APPLICATION

The present application claims priority to Japanese Application Number 2014-007558, filed Jan. 20, 2014, the entirety of which is hereby incorporated by reference.

BACKGROUND

The present disclosure relates to an on-vehicle device capable of connecting a plurality of mobile terminals, and more particularly, to an on-vehicle device which is mounted on a vehicle to perform engine control such as idling stoppage.

DESCRIPTION OF THE RELATED ART

Vehicles which perform engine control for stopping an engine during idling in order to reduce exhausted gas or save fuel have become widely spread. For example, engine control is performed by automatically stopping an engine while a vehicle waits for a signal at an intersection, and automatically restarting the engine when the signal has changed.

Japanese Patent Laid-Open No. 2004-106621 discloses an apparatus for automatically stopping and restarting an engine which is capable of greatly suppressing power consumption during automated stoppage of the engine so as to prolong an automatic operating time of the engine and uniformly suppress power consumption of a plurality of electronic devices so as not to significantly damage functions of those electronic devices.

Japanese Patent Laid-Open No. 2007-191097 discloses a vehicle control device which accurately calculates an available current value which can be supplied from a battery by using an available current value calculation unit, and controls an eco-run control unit and a current supply regulation unit based on the calculated available current value.

Frequently, a battery is mounted on a vehicle such as an idling-stop vehicle where an engine is stopped and then restarted. When the engine is restarted, in order to perform cranking by using power of a battery, a motor is activated. During the activation of the motor, since a relatively large power is consumed, a voltage supplied from the battery is temporarily decreased. FIG. 9A is a graph illustrating a change in the supplied voltage Vp of the battery when the engine is restarted. When the engine is stopped or when the engine is started and is in a normal state, the supplied voltage Vp of the battery has a constant value of, for example, about 14.4 V. When the stopped engine is restarted, the supplied voltage Vp is decreased down to about 4 V due to the activation of the motor as described above. After that, if the engine is started, the supplied voltage Vp is returned to the original voltage of 14.4 V. The period of the time t1 to t2 for restarting the engine is called cranking.

During the cranking, if the supplied voltage Vp is lower than an operating voltage of the on-vehicle device, the on-vehicle device may become temporarily inoperative. Therefore, as illustrated in FIG. 9B, there is a measure of boosting the voltage Vp supplied from the battery by using boost power supply so that each device is normally operated. For example, a boosted voltage of 6 V is supplied as power to VBUS of USB connection or the like. Accordingly, for example, during the cranking, audio may be reproduced by using a USB-connected mobile terminal without occurrence of sound interruption.

However, in recent years, a large number of USB ports including ports enabling rapid charging are employed in the on-vehicle device, and thus, power consumption required for the plurality of connection ports is increased. Therefore, as illustrated in FIG. 10A, the on-vehicle device may perform connection control of suppressing the power consumption through the USB connection to be equal to or lower than an allowable power of the battery by blocking the power supply to the USB port during the cranking. However, in this case, the operations of the mobile terminals in use are temporarily stopped. For example, in the case where music reproduction is performed by using the mobile terminal such as a USB audio or in the case where hands-free conversation is performed, temporary sound interruption occurs, so that a user may feel uncomfortable. In addition, in the case where updating of software of the on-vehicle device is performed by a USB memory, the updating may fail, so that the updating needs to be performed again inconveniently.

On the other hand, as illustrated in FIG. 10B, if the power for all the USB connection is desired to be compensated for during the cranking period, it is necessary to increase a current capacity of a choke coil of boost power supply so as to correspond to the compensation. In this case, there are problems in that the size of the boost power supply becomes large and a fuse of the on-vehicle device or the electric wiring in the vehicle may become disconnected.

In order to solve the above-described problems of the related art, the present disclosure is to provide an electronic device, a mobile terminal connection control method, and a power control program which are capable of continuously performing operations of mobile terminals in use when a voltage supplied from a battery is decreased.

BRIEF SUMMARY

According to an aspect of the present disclosure, there is provided an electronic device which becomes operative by power supplied from a battery mounted on a vehicle, including: a connection unit which is able to connect a plurality of mobile terminals and is able to supply the power from the battery; a monitoring unit which monitors usage states of the mobile terminals connected by the connection unit; a detection unit which detects whether or not a voltage supplied from the battery is equal to or lower than a threshold value; and a control unit which controls power supply to the mobile terminals through the connection unit based on a monitoring result of the monitoring unit when it is detected by the detection unit that the supplied voltage is equal to or lower than the threshold value.

Preferably, the connection unit is configured to include a plurality of connection ports, and the control unit determines the connection ports which are not disconnectable based on the monitoring result of the monitoring unit and continuously performs the power supply to the connection ports which are not disconnectable. Preferably, the connection unit is configured to include a plurality of connection ports, and the control unit determines disconnectable connection ports based on the monitoring result of the monitoring unit and blocks the power supply to the disconnectable connection ports. Preferably, the monitoring unit monitors a function which is executed by the electronic device, and the control unit determines based on the executed function whether or not the connection port is disconnectable. Preferably, the monitoring unit monitors the function according to whether or not an application installed in the electronic device is executed. Preferably, when music is reproduced based on music data through connection to the mobile terminal, when conversation is performed through connection to the mobile terminal, and when software updating is performed through connection to the mobile terminal, the control unit determines based on the monitoring result of the monitoring unit that the connection port to which the mobile terminal is connected is not disconnectable. Preferably, the control unit blocks the power supply to the connection ports which are determined in advance based on the monitoring result. Preferably, the connection unit is configured to include a plurality of types of connection ports which have different power supply amounts, and the control unit determines disconnectable connection ports based on the types of the connection ports. Preferably, the control unit determines disconnectable connection ports based on an allowable power amount corresponding to the time when the voltage supplied from the battery is equal to or lower than the threshold value. Preferably, the detection unit detects a cranking period of an engine based on the voltage supplied from the battery and status information of ignition and provides the detection result to the control unit. Preferably, the connection port is configured to include power supply lines for supplying power to the mobile terminals and switches connected between the power supply lines and power supply, and the switches are opened or closed in response to control signals from the control unit. The connection port is, for example, a USB connection port.

According to another aspect of the present disclosure, there is provided a mobile terminal connection control method in an electronic device which becomes operative by power supplied from a battery mounted on a vehicle and in which a plurality of mobile terminals are able to be connected through a plurality of connection ports of the electronic device, including: monitoring usage states of the mobile terminals connected through the connection ports; detecting whether or not a voltage supplied from the battery is equal to or lower than a threshold value; and controlling power supply to the mobile terminals through the connection ports based on a monitoring result of the monitoring when it is detected by the detecting that the supplied voltage is equal to or lower than the threshold value.

According to still another aspect of the present disclosure, there is provided a power control program which is executed by an electronic device which becomes operative by power supplied from a battery mounted on a vehicle and in which a plurality of mobile terminals are able to be connected through a plurality of connection ports of the electronic device, including: monitoring usage states of the mobile terminals connected through the connection ports; detecting whether or not a voltage supplied from the battery is equal to or lower than a threshold value; and controlling power supply to the mobile terminals through the connection ports based on a monitoring result of the monitoring when it is detected by the detecting that the supplied voltage is equal to or lower than the threshold value.

According to the present disclosure, in the case where the voltage supplied from a battery is decreased to be equal to or lower than the threshold value, the power supply to the mobile terminals is controlled according to the usage states of the connected mobile terminals, so that it is possible to continuously use the mobile terminals within a range of allowable power from the battery. For example, in an idling-stop vehicle, although the voltage supplied from the battery is temporarily decreased due to the cranking during the starting-up of the engine, it is possible to prevent sound interruption or the like of music reproduction using the mobile terminal during this period.

BRIEF DESCRIPTION OF THE DRAWINGS

FIG. 3 is a block diagram illustrating a configuration of the on-vehicle device according to the embodiment of the present disclosure.

FIG. 4 is a diagram illustrating a configuration of a mobile terminal connection program according to the embodiment of the present disclosure.

FIG. 5 is a diagram exemplifying monitoring information generated by a usage state monitoring unit.

FIG. 6A is a diagram illustrating an example of connection control performed by a connection control unit.

FIG. 6B is a diagram illustrating another example of connection control performed by a connection control unit.

FIG. 6C is a diagram illustrating still another example of connection control performed by a connection control unit.

FIG. 7 is a diagram exemplifying a USB connection control system used for description of connection control operations according to the embodiment.

DETAILED DESCRIPTION

Hereinafter, embodiments of the present disclosure will be described with reference to the drawings. The preferred embodiment of the present disclosure exemplifies a mobile terminal connection system which is configured to include an on-vehicle device to which a mobile terminal carried into a vehicle is able to be connected. The mobile terminal is a portable terminal which may be used in a state where the mobile terminal is connected to the on-vehicle device. For example, the mobile terminal is a smart phone, a tablet terminal, a mobile phone, a portable music player, a portable game machine, a terminal for updating, a traffic information acquisition module, or the like. The mobile terminal may have a communication function, a data storage function, and an information processing function, so that the mobile terminal may be connected to an external network, perform voice conversation, store audio data or video data, or perform various functions by using installed applications. In addition, the mobile terminal may have its own charging function, or the mobile terminal may receive power supplied from the outside to be operated.

On the other hand, the on-vehicle device is an electronic device mounted on the vehicle. The on-vehicle device may have an audio/video reproduction function, a television/radio broadcast reception function, a navigation function, and the like. The on-vehicle device and the mobile terminal may be connected to each other through a connection port such as USB, so that the on-vehicle device and the mobile terminal may perform transmission and reception of data required for each other. In the preferred embodiment, the connection port has a charging connection function for charging the connected mobile terminal and corresponds to standards of various charging methods such as BC1.2, SDP, and CDP. In addition, the on-vehicle device and the connected mobile terminal may share information or be cooperatively operated. The on-vehicle device may receive audio signals or video signals output from the mobile terminal through the connection port and may output the audio signals or the video signals from an on-vehicle display or an on-vehicle speaker. In addition, the on-vehicle device may manipulate the mobile terminal through the connection port and may execute applications included in the mobile terminal to receive the audio signals or the video signals from the mobile terminal. In addition, when there is an incoming call in the connected mobile terminal, the on-vehicle device supports so-called hands-free conversation.

In addition, in the preferred embodiment, the on-vehicle device is mounted on an idling-stop vehicle which performs automatic stopping of the engine during idling, and performs restarting of the engine by using a voltage supplied from a battery, and the on-vehicle device is operated by the voltage supplied from the battery.

Figure 1:
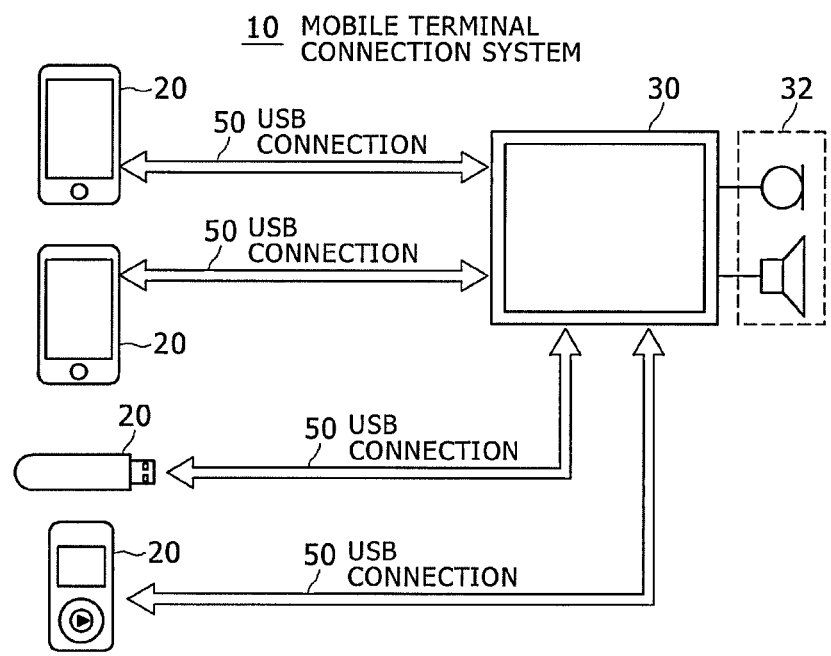
FIG. 1 is a diagram illustrating a mobile terminal connection system according to an embodiment of the present disclosure where an on-vehicle electronic device and mobile terminals are connected to each other.

FIG. 1 is diagram illustrating a configuration of a mobile terminal connection system according to an embodiment of the present disclosure. In the figure, the mobile terminal connection system 10 is configured to include a plurality of mobile terminals 20 and an on-vehicle device 30 to which the mobile terminals 20 are connected. Herein, the mobile terminals 20 are multifunctional smart phones, terminals for updating, portable music players, or the like having a communication function. The on-vehicle device 30 has a navigation function, a multimedia function, or a charging function for charging the connected mobile terminals 20 and is configured to further include a hands-free conversation set 32.

Each of the mobile terminals 20 enables communication connection and charging connection to the on-vehicle device 30 by using a universal serial bus (USB) connection 50. In addition, the mobile terminal 20 and the on-vehicle device 30 may be connected to connectors of a USB cable in order to correspond to USB connection 50. When the mobile terminal 20 and the on-vehicle device 30 are connected to each other by the USB cable, these devices are recognized by each other through USB plug-and-play. In addition, when the USB connection 50 is valid, the mobile terminal 20 may receive power supplied from the on-vehicle device 30, so that battery charging is enabled.

Figure 2:
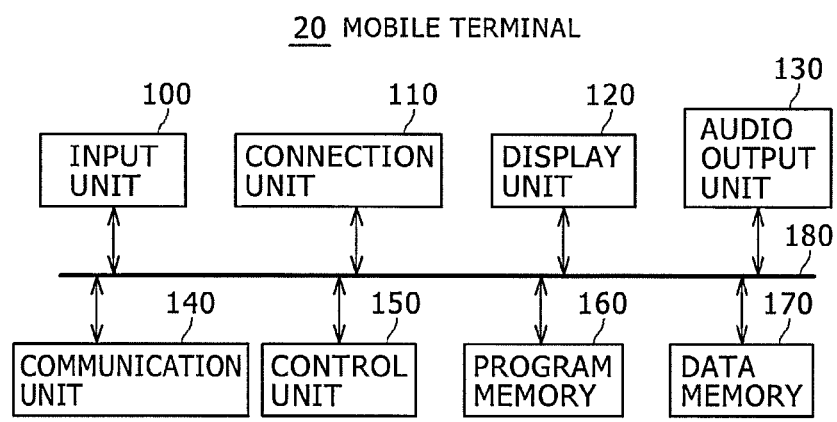
FIG. 2 is a block diagram illustrating a configuration of the mobile terminal according to the embodiment of the present disclosure.

FIG. 2 is a block diagram illustrating a typical configuration of the mobile terminal. The mobile terminals 20 is configured to include an input unit 100 which receives an input from a user, a connection unit 110 which enables connection to the on-vehicle device 30 by using the USB connection 50, a display unit 120 which displays various images on a display, an audio output unit 130 which outputs an audio, a communication unit 140 which enables data communication with an external network, conversation with a telephone via a public wireless network and the like, a control unit 150, a program memory 160 which stores application software, programs, and the like, a data memory 170 which stores audio data, video data, map data, and the like, and a bus 180 which connects the components.

The program memory 160 stores, for example, an application for reproducing audio data or video data, an application for executing a game, a program for performing voice conversation, a program for browsing information on the Internet through the communication unit 140, and the like. Furthermore, the program memory 160 includes an extended program for operating the mobile terminal 20 and the on-vehicle device 30 in an extended operation mode when the mobile terminal 20 and the on-vehicle device 30 are connected by using the USB connection 50. In the extended operation mode, the extended program decodes commands transmitted from the on-vehicle device 30 and controls each of the components according to the commands. For example, an application for music reproduction of the mobile terminal side is activated from the on-vehicle device side, and an audio signal reproduced by the application is transmitted to the on-vehicle device 30 through audio connection 44.

FIG. 3 is a block diagram illustrating a typical configuration of the on-vehicle device 30. As illustrated in the figure, the on-vehicle device 30 is configured to include an input unit 200 which receives an input from a user, a connection unit 210 which enables connection to the mobile terminals 20 by using the USB connection 50, a display unit 220, an audio output unit 230 which outputs an audio, a multimedia unit 240 which executes reproduction and the like of various media, a control unit 250, a program memory 260 which stores programs for executing applications and the like, a data memory 270 which stores data such as audio data, video data, map data and the like, and a bus 280 which connects the components.

The connection unit 210 is configured to include a plurality of connection ports for the USB connection 50. As described later, the connection port 210 according to the embodiment may be configured to include a switch between power supply from a battery and a power supply line of the USB connection in order to enable power control during cranking. The switch is opened or closed in response to a control signal from the control unit 250 to control the power of the USB connection.

The multimedia unit 240 has a function of reproducing audio data or video data recorded on a CD, a DVD, a Blu-ray disc, a memory medium, the connected mobile terminal 20, the data memory 270 and the like, as well as a function of receiving television broadcast or radio broadcast and the like. The program memory 260 stores a program for controlling an extended operation mode during the connection to the mobile terminal 20 and the like in addition to an application for executing a navigation function and a program for controlling the multimedia unit 240. In addition, the on-vehicle device 30 may receive GPS positioning information, vehicle speed information, direction information and the like necessary for the navigation operation.

In the preferred embodiment, the control unit 250 may be configured with a microcontroller including a ROM, a RAM and the like, and the ROM or the RAM may store various programs for controlling operations of the components of the on-vehicle device. In the embodiment, the control unit 118 retains a mobile terminal connection program for controlling power supply to the connected mobile terminal based on a voltage supplied from the battery mounted on the vehicle.

FIG. 4 is a diagram illustrating a configuration of the mobile terminal connection program according to the embodiment. The mobile terminal connection program 300 is a program for controlling power supply to the connected mobile terminal in order to suppress power consumption during the cranking and is executed by the control unit 250. The mobile terminal connection program 300 is configured to include a mobile terminal connection unit 302 which connects a plurality of mobile terminals 20 and enables operations thereof by the power supplied from the battery or the USB connection, a usage state monitoring unit 304 which monitors a usage state of the connected mobile terminals 20, a cranking detection unit 306 which detects the cranking based on the voltage supplied from the battery and an ignition key state, and a control unit 308 which controls power supply of the mobile terminal connection unit 302 based on monitoring information of the usage state monitoring unit 304 when the cranking is detected.

The mobile terminal connection unit 302 may electrically connect the mobile terminals connected to a plurality of the connection ports, for example, USBs. Therefore, the mobile terminals 20 are connected to the on-vehicle device 30 for communication connection. Accordingly, the on-vehicle device 30 may perform communication with each of the mobile terminals, the mobile terminals may be manipulated from the on-vehicle device side, and each of the functions or the data may be shared. In addition, the mobile terminals 20 are connected to the on-vehicle device 30 for charging connection, so that the connected mobile terminals are charged through the on-vehicle device 30.

The usage state monitoring unit 304 may check whether or not the mobile terminal is connected and monitor the usage state of the connected mobile terminal. In addition, the usage state monitoring unit 304 may generate the monitoring information representing the monitoring result sequentially and provide the monitoring information to the control unit 308. For example, in the case where a smart phone is connected, the usage state monitoring unit 304 may monitor the usage state such as a hands-free conversation state, a music reproduction state, and an unused state of the mobile terminal 20 based on operation states of an operating system or an application software installed in the on-vehicle device. In addition, if the usage state monitoring unit 304 is able to monitor a current supplied from the connection port to the mobile terminal, the usage state monitoring unit 304 may monitor the usage state of the mobile terminal based on the supplied current. Furthermore, the usage state monitoring unit 304 may update software in a mobile terminal or may monitor a usage state such as a communication state in a traffic information acquisition module.

FIG. 5 is a diagram exemplifying the monitoring information generated by the usage state monitoring unit. For example, in the monitoring information, the usage state of each mobile terminal from the monitoring result of the usage state monitoring unit 304 is written according to each connection port (each port type) installed in the on-vehicle device. The information on the usage state is updated appropriately according to a change in the usage state of the mobile terminal.

The cranking detection unit 306 detects the cranking according to whether or not the power supplied from the battery is equal to or lower than a threshold value. Furthermore, in the preferred embodiment, the cranking detection unit 306 may acquire status (state) information from an ignition switch, and for example, when the ignition switch is in the on state and the voltage supplied from the battery is equal to or lower than the threshold value, it may be determined that the cranking is detected. A charging downstream port (CDP) is active USB 2.0 data communication supporting 1.5 A; a standard downstream port (SDP) is active USB 2.0 data communication supporting 500 mA; and BC 1.2 is a specification of battery charging (USB Battery Charging Specification Revision 1.2). These types are merely exemplary.

When the cranking is detected by the cranking detection unit 306, the control unit 308 may control power supply to the mobile terminal during the cranking period based on the monitoring information generated by the usage state monitoring unit 304. For example, during the cranking, in the case where the connected smart phone is used for the hands-free conversation or the music reproduction, the control unit 308 may maintain the power supply to the connection ports in use, but may temporarily block the power supply to the connection ports which are determined to be unused. The control unit 308 determines disconnectable connection ports based on the monitoring information. In short, the control unit 308 determines the disconnectable connection ports when the power falls below an allowable power from the battery to the USB ports during the cranking. Although there are various algorithms for the determination, for example, as described above, the power supply to the connection ports may be blocked except for the connection ports in use. Otherwise, a relationship between the connection ports in use and the to-be-disconnected connection ports is stored in a determination table in advance, and the connection ports to be disconnected may be determined according to the table. Furthermore, priority may be designated to ports which are determined to be disconnectable in advance, and connection of the unused connection ports may be maintained within the range not exceeding the above-described available power. In this case, priority may be designated to the connection of the connection ports which are in an unused state but in a charging state. The control unit 308 provides a control signal for opening the switch of the connection port which is determined to be disconnectable to the connection unit 210.

FIGS. 6A, 6B, and 6C are diagrams illustrating examples of connection control of the on-vehicle device according to the embodiment. For example, in the case where a USB audio is in music reproduction at the connection port 2 and a USB device is in communication at the connection port 3, as illustrated in FIG. 6A, during the cranking period, when the USB connected mobile terminal is in charging while maintaining the power supply to the connection ports 2 and 3 in use and blocking the power supply to the connection ports 1 and 4 which are connected to peripheral devices, the control unit 308 arbitrarily determines whether the mobile terminal is an unused mobile terminal or a mobile terminal in use. In the case where disconnection of any one of the connection ports 1 and 4 is sufficient, if the connection port 1 is in charging and the connection port 4 is not in charging, the connection port 4 is disconnected.

As another example of the connection control, FIG. 6B illustrates the case where music reproduction or hands-free conversation is performed by a smart phone at the connection port 1. In this case, the control unit 308 maintains the power supply to the smart phone and blocks the power supply to the unused connection ports 2 to 4 only during the cranking period. FIG. 6C illustrates the case where software of the on-vehicle device side is updated by a terminal for updating. The control unit 308 maintains the power supply to the connection port 4 of the terminal for updating in use and blocks the power supply to the unused connection ports 1 to 3. In this manner, the control unit 308 maintains the power supply to the mobile terminal in use and blocks the power supply to the mobile terminal of which temporary operation stoppage does not cause problems based on the monitoring information, so that the total power consumption during the cranking period is suppressed and the operations of the mobile terminals in use are compensated for.

Next, connection control operations of the on-vehicle device according to the embodiment will be described by using a USB connection control system exemplified in FIG. 7, and a flowchart illustrated in FIG. 8.

Figure 8:
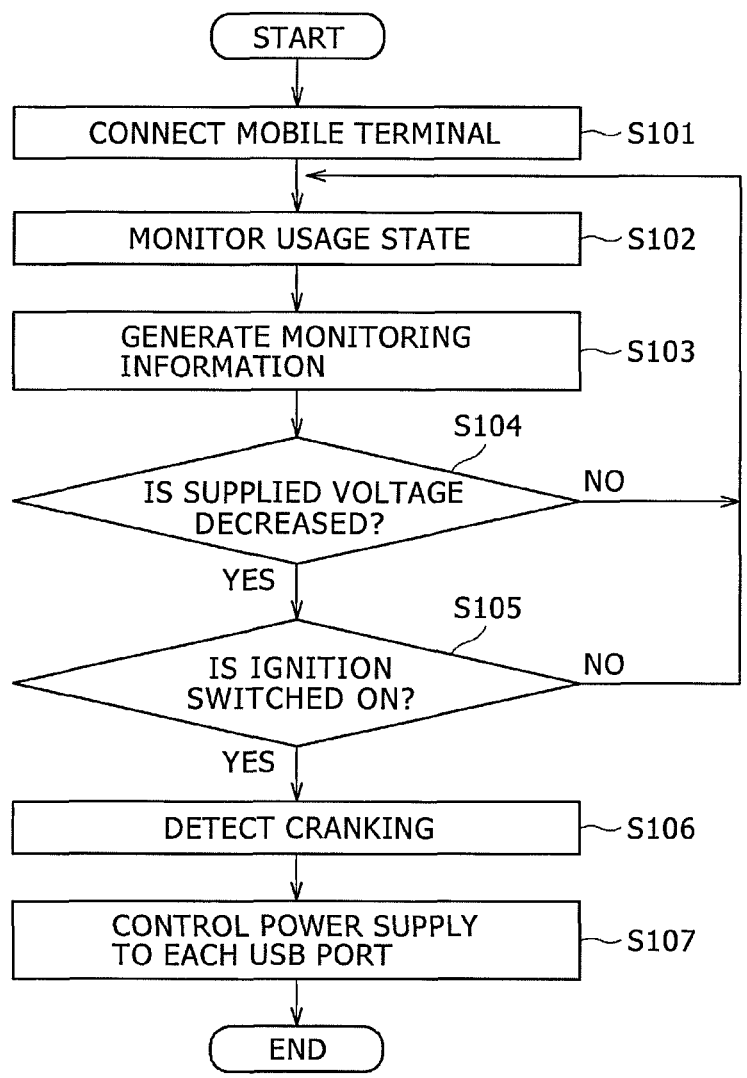
FIG. 8 is a flowchart explaining connection control operations performed by the mobile terminal connection program according to the embodiment.
Figure 9A:
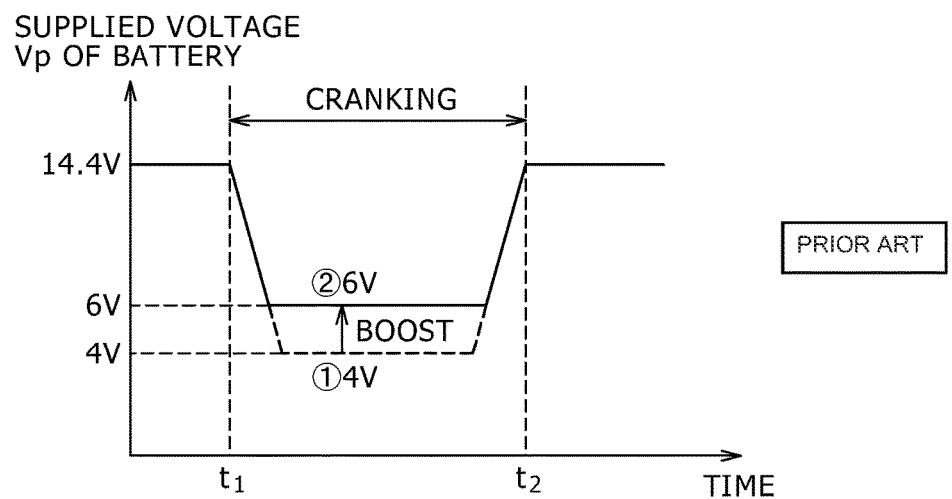
FIG. 9A is a graph illustrating a change in a voltage of a battery at the time of restarting an engine.
Figure 9B:
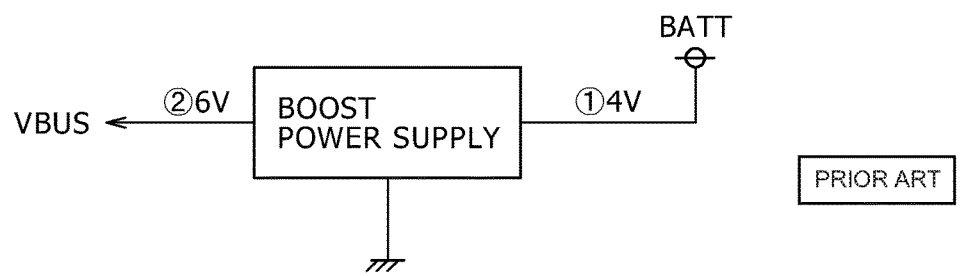
FIG. 9B is a diagram explaining boost power supply.
Figure 10A:
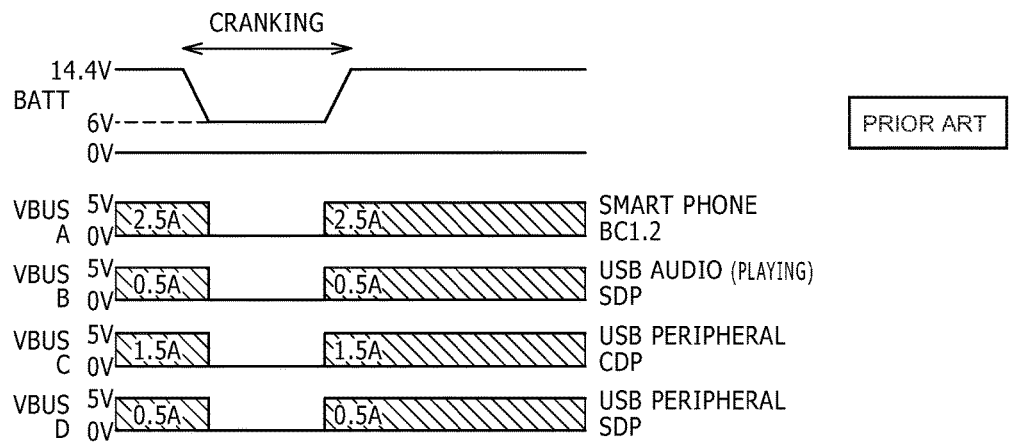
FIGS. 10A and 10B are diagrams explaining power supply control in an on-vehicle device of the related art and problems thereof.
Figure 10B:
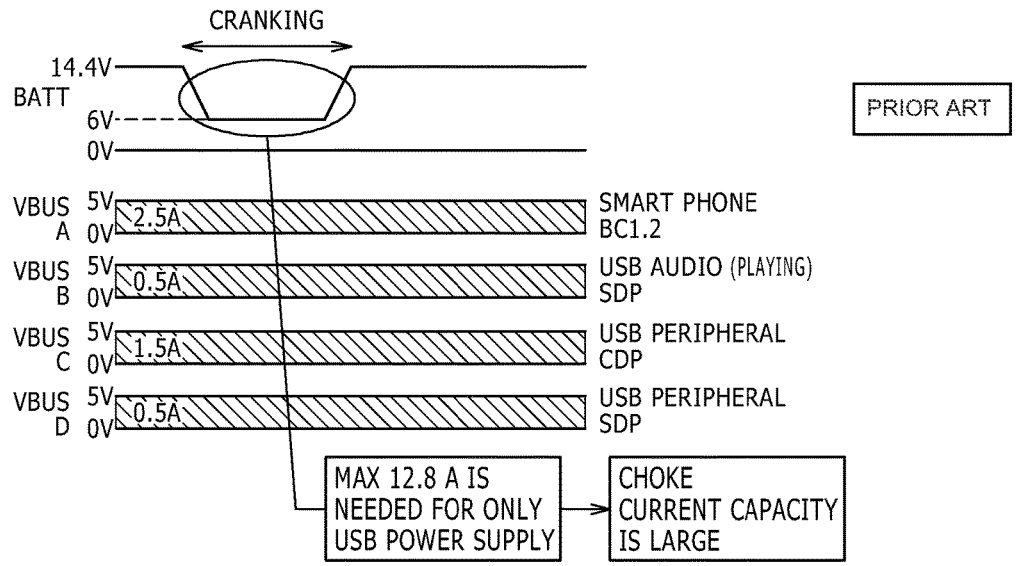

As illustrated in FIG. 8, the USB connection control system 400 is configured to include a plurality of USB ports 402, a plurality of switches 404, each of which turns on/off the power supply to the connected mobile terminal, corresponding to the respective USB ports 402, a battery detection unit 406 which detects a voltage supplied from the battery, an ignition detection unit 408 which detects status information of ignition, and a control unit 250 which is connected to the components. The control unit 250 controls operations of the components according to the above-described mobile terminal connection program 300.

First, if the mobile terminals 20 are inserted into the USB ports 402 installed in the on-vehicle device, the mobile terminal connection unit 302 identifies the mobile terminals 20 of the respective USB ports, and the switches 404 are turned on by the control unit 308, so that the power is supplied through the USB ports to the mobile terminals 20. As a result, the connection between the on-vehicle device 20 and the mobile terminals 30 is completed (S101). If the mobile terminals 20 and the on-vehicle device 30 are connected, bi-directional communication of data or control signals and the like is enabled through data lines. For example, audio signals or video signals output from the mobile terminals 20 are input to the on-vehicle device through the connection ports, so that the audio signals or the video signals may be output from on-vehicle displays or on-vehicle speakers.

The usage state monitoring unit 304 monitors the usage states of the connected mobile terminals 20 (S102), generates the monitoring information illustrated in, for example, FIG. 5 based on the monitoring result, and notifies the monitoring information (S103). The monitoring of the usage states of the respective mobile terminals 20 is continuously performed during the period when the on-vehicle device 30 is in the activated state and the mobile terminals are in the connected state.

On the other hand, when the battery detection unit 406 detects that the voltage supplied from the battery is equal to or lower than the threshold value (S104) and the ignition detection unit 408 detects based on the status information that the ignition switch is in the on state (S105), the cranking detection unit 306 detects that it is the cranking period (S106).

If the cranking is detected, the control unit 308 determines the disconnectable connection ports based on the monitoring information generated by the usage state monitoring unit 304 and controls the power supply to the respective connection ports. More specifically, the control unit 250 illustrated in FIG. 7 controls the switches 404 to be opened so that the power supply to the USB ports 402 which are determined to be disconnectable is blocked. The switches 404 for the connection ports which are determined not to be disconnectable are closed. The control unit 250 returns the opened switches 404 to be closed in response to the fact that the cranking is not detected by the cranking detection unit 306 and restarts the power supply to the disconnected connection ports.

In this manner, according to the embodiment, when restarting the engine from the idling/stopped state, although the power supplied from the battery is decreased down to the threshold value or less due to the cranking, the operations of the mobile terminals in use may be continuously maintained.

In addition, in the case where the on-vehicle device 30 includes different types of the connection ports as illustrated in FIG. 5, the disconnection or non-disconnection of the connection ports may be determined according to the type. For example, in order to enable rapid charging, a connection port for rapid charging which is able to flow a current larger than that of a normal standard connection port may be installed. Alternatively, a connection port for large current which is able to flow a large current for driving a large load may be installed. In these cases, since only the normal standard connection port is used, when the connection is determined to be non-disconnectable, the control unit 308 may automatically disconnect the connection port for rapid charging or large current.

In addition, when the maximum current which is able to be flowed into the connection port is known, the control unit 308 may calculate the consumed power from the connection port in use or the unused connection port; and in the case where the power consumption falls below the allowable power from the battery, the control unit 308 may not disconnect the connection port. Only in the case where the power consumption is larger than the allowable power, the control unit 308 may select the disconnectable connection ports and disconnect the power supply to the disconnectable connection ports. In addition, if the power supplied from the connection port is able to be dynamically detected, the connection port which is optimally suitable for disconnection from the detected consumed power may be determined.

In addition, the control unit 308 may prepare a table defining a relationship between the connection ports in use and the disconnectable connection port in advance. For example, among the connection ports 1 to 4, when the connection port 1 is in use, the connection port 3 is disconnected; when the connection port 2 is in use, the connection port 4 is disconnected; when the connection port 3 is in use, the connection ports 1 and 2 are disconnected; and when the connection port 4 is in use, the connection port 2 is disconnected.

Heretofore, while the preferred embodiments of the disclosure are described in detail, the invention is not limited to the specific embodiments, but various changes and modifications are available within the scope of the spirit of the invention disclosed in the claims.

What is claimed is:

1. An electronic device which becomes operative by power supplied from a battery mounted on a vehicle, comprising:
   a connection unit which is able to connect a plurality of mobile terminals and is able to supply the power from the battery;
   a monitoring unit which monitors usage states of the mobile terminals connected by the connection unit;
   a detection unit which detects whether or not a voltage supplied from the battery is equal to or lower than a threshold value; and
   a control unit which controls power supply to the mobile terminals through the connection unit based on a monitoring result of the monitoring unit when it is detected by the detection unit that the supplied voltage is equal to or lower than the threshold value;
   wherein the detection unit detects a cranking period of an engine based on the voltage supplied from the battery and status information of ignition and provides the detection result to the control unit.

2. The electronic device according to claim 1, wherein the connection unit is configured to include a plurality of connection ports, and the control unit determines the connection ports which are not disconnectable based on the monitoring result of the monitoring unit and continuously performs the power supply to the connection ports which are not disconnectable.

3. The electronic device according to claim 1, wherein the connection unit is configured to include a plurality of connection ports, and the control unit determines disconnectable connection ports based on the monitoring result of the monitoring unit and blocks the power supply to the disconnectable connection ports.

4. The electronic device according to claim 1, wherein the connection unit is configured to include a plurality of connection ports, and wherein the control unit blocks the power supply to the connection ports which are determined in advance based on the monitoring result.

5. The electronic device according to claim 1, wherein the connection unit is configured to include plural types of connection ports which have different power supply amounts, and the control unit determines disconnectable connection ports based on the types of the connection ports.

6. The electronic device according to claim 1, wherein the connection unit is configured to include a plurality of connection ports, and wherein the control unit determines disconnectable connection ports based on an allowable power amount corresponding to the time when the voltage supplied from the battery is equal to or lower than the threshold value.

7. The electronic device according to claim 1, wherein the connection unit is configured to include a plurality of connection ports, and wherein the connection ports are configured to include power supply lines for supplying power to the mobile terminals and switches connected between the power supply lines and the battery, and the switches are opened or closed in response to control signals from the control unit.

8. The electronic device according to claim 1, wherein the connection unit is configured to include a connection port, and wherein the connection port is a USB connection port.

9. An electronic device which becomes operative by power supplied from a battery mounted on a vehicle, comprising:
a connection unit which is able to connect a plurality of mobile terminals and is able to supply the power from the battery, wherein the connection unit is configured to include a plurality of connection ports;
a monitoring unit which monitors usage states of the mobile terminals connected by the connection unit;
a detection unit which detects whether or not a voltage supplied from the battery is equal to or lower than a threshold value; and
a control unit which controls power supply to the mobile terminals through the connection unit based on a monitoring result of the monitoring unit when it is detected by the detection unit that the supplied voltage is equal to or lower than the threshold value;
wherein the monitoring unit monitors a function which is executed by the electronic device, and the control unit determines based on the executed function whether or not a connection port is disconnectable; and,
wherein the monitoring unit monitors the function according to whether or not an application installed in the electronic device is executed.

10. The electronic device according to claim 9, wherein the control unit determines connection ports which are not disconnectable based on the monitoring result of the monitoring unit and continuously performs the power supply to the connection ports which are not disconnectable.

11. The electronic device according to claim 9, wherein the control unit determines disconnectable connection ports based on the monitoring result of the monitoring unit and blocks the power supply to the disconnectable connection ports.

12. The electronic device according to claim 9, wherein the connection unit is configured to include plural types of connection ports which have different power supply amounts, and the control unit determines disconnectable connection ports based on the types of the connection ports.

13. The electronic device according to claim 9, wherein the connection ports are USB connection ports.

14. An electronic device which becomes operative by power supplied from a battery mounted on a vehicle, comprising:
a connection unit which is able to connect a plurality of mobile terminals and is able to supply the power from the battery;
a monitoring unit which monitors usage states of the mobile terminals connected by the connection unit;
a detection unit which detects whether or not a voltage supplied from the battery is equal to or lower than a threshold value; and
a control unit which controls power supply to the mobile terminals through the connection unit based on a monitoring result of the monitoring unit when it is detected by the detection unit that the supplied voltage is equal to or lower than the threshold value;
wherein when music is reproduced based on music data through connection to a mobile terminal, when conversation is performed through connection to the mobile terminal, and when software updating is performed through connection to the mobile terminal, the control unit determines based on the monitoring result of the monitoring unit that a connection port to which the mobile terminal is connected is not disconnectable.

15. The electronic device according to claim 14, wherein the connection unit is configured to include a plurality of connection ports, and the control unit determines the connection ports which are not disconnectable based on the monitoring result of the monitoring unit and continuously performs the power supply to the connection ports which are not disconnectable.

16. The electronic device according to claim 14, wherein the connection unit is configured to include a plurality of connection ports, and the control unit determines disconnectable connection ports based on the monitoring result of the monitoring unit and blocks the power supply to the disconnectable connection ports.

17. The electronic device according to claim 14, wherein the connection unit is configured to include plural types of connection ports which have different power supply amounts, and the control unit determines disconnectable connection ports based on the types of the connection ports.

18. The electronic device according to claim 14, wherein the connection port is a USB connection port.

* * * * *